Patented Jan. 1, 1935

1,985,955

UNITED STATES PATENT OFFICE 1,985,955

PROCESS FOR SWEETENING HYDROCARBON OIL

Loilor Jordan Snyder, Martinez, Calif., assignor to Shell Development Company, San Francisco, Calif., a corporation of Delaware No Drawing. Application September 29, 1930, Serial No. 485,312

4 Claims. (Cl. 196—33)

This process relates to the treatment of hydrocarbon oils for the removal of sulfur and sulfur compounds and particularly to the "doctor treatment" of light petroleum oils as gasoline and kerosene.

Gasoline refined by the "doctor treatment", of which this process is an improvement, has a very marked tendency to discolor and get cloudy when exposed to the sunlight. This property of color- and haze-instability is objectionable and detracts from the commercial value of the product.

The object of this invention is the "sweetening" of hydrocarbon oil by an improved process so that the product is both haze- and color-stable.

The sour odor of gasoline is usually ascribed to compounds containing sulfur such as the mercaptans. These compounds are usually removed by the "doctor treatment", which consists of treating the gasoline with certain solutions containing lead such as a solution of sodium plumbite in sodium hydroxide. The sodium plumbite acts to decompose the mercaptans present; some free sulfur is added in the end of the treatment to assist in the precipitation of the insoluble lead sulfides formed.

As the process is usually carried out sufficient sodium plumbite solution is added to the gasoline to react with the sulfur-bearing hydrocarbons. Generally, in this reaction the gasoline takes on a greenish color. Sulfur is then added to the mixture to precipitate the lead. As this sulfur is being added, the color of the mixture changes to yellow, red, deep red, reddish brown and then to a very cloudy black-red, or brown. At this point, with a very little addition of sulfur, "the lead sulfide break" occurs which consists of the sudden precipitation of the lead sulfide, leaving the gasoline clear and practically colorless. It is always necessary to add sulfur a little in excess of that just needed to combine with the lead, in order to start the precipitation. Consequently, there is always a little free sulfur dissolved in the gasoline after the treatment is completed, and this is one of the causes of haze- and color-instability in gasoline so treated.

The process of my invention consists in treating the gasoline with sodium plumbite as usual but with insufficient sulfur to precipitate out the lead. The gasoline, plumbite, and sulfur are mixed in any manner whereby intimate contact between them may be made. The amount of sulfur used depends on the gasoline, some requiring considerably more than others, but for each case the amount used is less than the amount needed to precipitate the lead. This is in distinct contrast with the regular process, the essence of which is the addition of a slight excess of sulfur to start precipitation. In actual practice, the color of the mixture is used to indicate the quantity of sulfur to be added and the point at which this addition is to cease. As was before mentioned, the gasoline, after being mixed with the plumbite, usually takes on a greenish color. As the sulfur is added this color changes to yellow, red, reddish brown, or in some cases brown. The addition of sulphur may be stopped at any of these stages, preferably at a point where the oil is transparent and of a deep red or brown color. The point at which the addition of sulfur is stopped is easily determined by one familiar with the art, and with the range of color change indicating the various concentrations of sulfur in the mixture. In every case this point comes while the oil is still transparent, or at most, slightly opaque. The oil must not be allowed to become cloudy, since such a cloud indicates that just a very little more sulfur, if added, would effect complete precipitation. By this method all the sulfur that is added goes into chemical combination and no free sulfur will remain dissolved in the product.

After treatment to this stage the gasoline mixture of red or brown color is subjected to any suitable process whereby decolorization may be effected. This can be accomplished by any one of a number of ways, such as clay treating, water washing, acid washing, silica gel treating, filtration through carbon, agitation and filtration, or other mechanical or chemical means.

In this process I prefer to use a clay treatment. The treater to which the gasoline mixture is passed may be of any type wherein thorough agitation is possible so that intimate mixing of the clay and oil is obtained. The clay oil mixture is then sent through a filter press or other apparatus whereby the clay is removed. The amount of clay necessary depends on the character of the gasoline and the amount of sulfur which has been added. As a rule, this amount is small, it being very seldom necessary to add more than 2.0% of clay to yield a product of satisfactory color. I have also used water washing with very good results. Though not as efficient as the clay treatment, it has the advantage of being simpler and less expensive.

The gasoline resulting from the clay or water treatment is sweet in odor, has a colorless appearance and is haze- and color-stable to a marked degree in the sunlight. This product is generally not negative to the doctor test but slightly positive. However, the gasoline is sweet in odor and can be considered "sweetened" for all practical purposes. Its physical characteristics are then identical with those of a gasoline fully sweetened in the regular manner, but after exposure to sunlight even for only an hour, the superior qualities of my improved product become distinctly evident.

As an illustration and proof of the qualities of this gasoline I have compared it with samples of fully sweetened, first-cut pressure gasoline treated in the usual manner. These tests were made in four ounce clear glass bottles, the samples being exposed to bright sunlight and examined for haze and color at stated intervals. The color change is indicated by the Saybolt color scale.

*Haze stability*

| Gasoline | Start | Appearance after— | | |
|---|---|---|---|---|
| | | 1 hour | 3 hours | 5 hours |
| Regular process fully sweetened | Clear | Clear | Slightly hazy | Cloudy. |
| Sweetened by my method | ...do... | ...do... | Clear | Clear. |

*Color stability*

| Gasoline | Start | Color after— | | |
|---|---|---|---|---|
| | | 1 hour | 3 hours | 5 hours |
| Regular process fully sweetened | 23+ | 17 | (Too cloudy). | (Too cloudy). |
| Sweetened by my method | 23+ | 23+ | 18+ | 16 |

From the above it will be noted that this product is perfectly haze stable to the tests and that the color of this product after four or five hours' exposure was about like that of the regular gasoline after one hour.

Sometimes it is not practical or desirable to treat the red gasoline from the sweetening process directly with the clay. In this case the mixture may be run into a storage tank and allowed to stand. Many of the gasolines, on so standing for some time will change from a red or brown to a very light brown or yellow color at the same time depositing a precipitate of lead sulfide in the bottom of the tank. When it is desired to treat this gasoline, the lighter colored liquid may be drawn off from the precipitate and passed to the clay mixer. In treating this oil, considerably less clay is necessary than when the liquid comes direct from the sweetening process.

Some gasolines are only slightly sour and require very little sweetening treatment. In such cases the addition of sulfur is often unnecessary. When these gasolines are treated by my process it is only necessary to treat them with small amounts of the sodium plumbite and then pass directly to the clay treater without any addition of sulfur. Upon removal of the clay the product is clear, colorless and sweet and very stable to sunlight.

By way of illustrating my process, I have described the treatment of gasoline. However, I do not limit myself to this particular product, my method being applicable to the treatment of any hydrocarbon oil that can be refined and sweetened by the doctor process as generally employed in the petroleum industry.

I claim as my invention:

1. The process for sweetening hydrocarbon oils comprising treating the oils with sodium plumbite, adding sulfur in an amount just short of that which would cause precipitation of lead sulfide but sufficient to produce oils of sweet odor, and subsequently treating them to remove the color without further addition of sulfur.

2. The process for sweetening gasoline or kerosene comprising treating it with sodium plumbite, adding sulfur in an amount just short of that which would cause precipitation of lead sulfide but sufficient to produce oils of sweet odor and subsequently treating it to remove the color without further addition of sulfur.

3. The process for sweetening gasoline comprising treating it with sodium plumbite, gradually adding sulfur till the color of the gasoline mixture becomes red or brown but in an amount just short of that which would cause precipitation of lead sulfide and subsequently treating it with clay to remove the color without further addition of sulfur.

4. The process for sweetening a mineral oil distillate comprising: mixing said distillate with sodium plumbite solution, adding to the resultant mixture just enough free sulfur to react chemically with the materials comprising said mixture, which is just short of the quantity required to break the resultant suspension, separating the treated distillate from the spent sodium plumbite solution, and then decolorizing the treated distillate without further addition of sulfur.

LOILOR JORDAN SNYDER.